United States Patent
Xu et al.

(10) Patent No.: US 6,428,607 B1
(45) Date of Patent: Aug. 6, 2002

(54) PRESSURE SWING ADSORPTION PROCESS WHICH PROVIDES PRODUCT GAS AT DECREASING BED PRESSURE

(75) Inventors: Jianguo Xu, Wrightstown; Mark Robert Pillarella, Center Valley; Douglas Paul Dee, Fogelsville, all of PA (US)

(73) Assignee: Air Products and Chemicals, Inc., Allentown, PA (US)

(*) Notice: Subject to any disclaimer, the term of this patent is extended or adjusted under 35 U.S.C. 154(b) by 36 days.

(21) Appl. No.: 09/602,719

(22) Filed: Jun. 26, 2000

(51) Int. Cl.$^7$ .............................................. B01D 53/053
(52) U.S. Cl. .............................. 95/101; 95/102; 95/105; 95/130
(58) Field of Search ...................... 95/96–98, 100–103, 95/130, 138, 104–106

(56) References Cited

U.S. PATENT DOCUMENTS

| | | | |
|---|---|---|---|
| 4,406,675 A | 9/1983 | Dangieri et al. ............... 55/26 |
| 4,468,237 A | 8/1984 | Fuderer ............................ 55/26 |
| 5,203,888 A | 4/1993 | Maurer ............................ 55/26 |
| 5,328,503 A | 7/1994 | Kumar et al. ................... 95/101 |
| 5,330,561 A | 7/1994 | Kumar et al. ................... 95/101 |
| 5,370,728 A | * 12/1994 | LaSala et al. .................. 95/101 |
| 5,411,578 A | 5/1995 | Watson et al. ................. 95/101 |
| 5,429,666 A | 7/1995 | Agrawal et al. ................ 95/101 |
| 5,536,299 A | * 7/1996 | Girard et al. ................. 95/103 X |
| 5,540,758 A | 7/1996 | Agrawal et al. ................ 95/101 |
| 5,565,018 A | * 10/1996 | Baksh et al. ................. 95/103 X |
| 5,656,067 A | 8/1997 | Watson et al. ................. 95/101 |
| 5,658,371 A | * 8/1997 | Smolarek et al. ........... 95/103 X |
| 5,702,504 A | * 12/1997 | Schaub et al. ............. 95/103 X |
| 5,755,856 A | * 5/1998 | Miyake et al. ............. 95/102 X |
| 6,045,603 A | * 4/2000 | Chen et al. ................ 95/103 X |
| 6,156,101 A | * 12/2000 | Naheiri ...................... 95/102 X |

FOREIGN PATENT DOCUMENTS

EP 0354259 2/1990

* cited by examiner

*Primary Examiner*—Robert H. Spitzer
(74) *Attorney, Agent, or Firm*—John M. Fernbacher

(57) ABSTRACT

A pressure swing adsorption process for the separation of a pressurized feed gas containing at least one more strongly adsorbable component and at least one less strongly adsorbable component. The process comprises (a) introducing the pressurized feed gas into a feed end of an adsorber bed containing one or more solid adsorbents which preferentially adsorb the more strongly adsorbable component and withdrawing from a product end of the adsorber bed a first adsorber effluent gas enriched in the less strongly adsorbable component, wherein the first adsorber effluent gas is utilized as final product gas; (b) terminating the introduction of the pressurized feed gas into the adsorber bed while withdrawing from the product end of the adsorber bed a second adsorber effluent gas enriched in the less strongly adsorbable component, wherein the pressure in the adsorber bed decreases while the second adsorber effluent gas is withdrawn therefrom, and wherein the second adsorber effluent gas is utilized as additional final product gas; (c) depressurizing the adsorber bed to a minimum bed pressure by withdrawing additional gas therefrom; (d) repressurizing the adsorber bed by introducing repressurization gas into the bed, wherein at least a portion of the repressurization gas is provided by pressurized feed gas; and (e) repeating steps (a) through (d) in a cyclic manner. No final product gas is required for purge or repressurization in the process cycle steps.

19 Claims, 2 Drawing Sheets

| | | | | | | | | |
|---|---|---|---|---|---|---|---|---|
| Bed A → | Make Product/ Feed | Make Product/ No Feed | Provide Purge | PPE/ Evac | Evacuation | Rec Purge | PE/ Atm | Atm Rep | Atm/Feed Repress |
| Bed B → | Rec Purge | PE/ Atm | Atm Rep | Atm/Feed Repress | Make Product/ Feed | Make Product/ No Feed | Provide Purge | PPE/ Evac | Evacuation |
| Bed C → | Provide Purge | PPE/ Evac | Evacuation | Receive Purge | PE/ Atm | Atm Rep | Atm/Feed Repress | Make Product/ Feed | Make Product/ No Feed |

| Bed A → | Make Product/Feed | | | Make Product/No Feed | | | Provide Purge | PPE/Evac | Evacuation | | | Rec Purge | PE/Atm | Atm Rep | Atm/Feed Repress |
|---|---|---|---|---|---|---|---|---|---|---|---|---|---|---|---|
| Bed B → | Rec Purge | PE/Atm | PPE/Evac | Evacuation | | | Make Product/Feed | | Make Product/No Feed | | Atm Rep | Atm/Feed Repress | Provide Purge | | Evacuation |
| Bed C → | Provide Purge | | | Evacuation | | | Receive Purge | PE/Atm | Make Product/Feed | | | Make Product/No Feed | | | |

PRESSURE SWING ADSORPTION PROCESS WHICH PROVIDES PRODUCT GAS AT DECREASING BED PRESSURE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Pressure swing adsorption is a well-known method for the separation of bulk gas mixtures and for the purification of gas streams containing low concentrations of undesirable components. The method has been developed and adapted for a wide range of feed gases, operating conditions, product purity, and product recovery. Many pressure swing adsorption systems utilize two or more adsorber beds operated in a cyclic sequence in order to maintain a constant product flow rate while selected beds undergo various steps including adsorption, depressurization, evacuation, purge, pressure equalization, repressurization, and other related steps. Multiple adsorber beds using numerous process steps are required to achieve high purity and/or recovery of valuable gaseous products such as hydrogen, carbon oxides, synthesis gas, light hydrocarbons, and the like. Multiple adsorber beds using these process steps also are used to recover oxygen from air.

Many of these pressure swing adsorption processes operate partially at pressures below atmospheric and are described in the art as vacuum swing adsorption (VSA) or vacuum-pressure swing adsorption (VPSA) processes. In the present specification, pressure swing adsorption (PSA) is used as a generic term to describe all types of cyclic adsorption systems regardless of operating pressure levels.

In pressure swing adsorption process cycles, the gas needed for the purge and repressurization steps is provided by gas obtained during other process steps. Repressurization can be accomplished by using final product gas, intermediate gas obtained by pressure equalization among beds, pressurized feed gas, or combinations thereof. Purge can be provided by intermediate depressurization gas from other beds and/or by final product gas.

Feed repressurization is disclosed in representative U.S. Pat. Nos. 4,406,675 and 5,540,758, and in European Patent Publication No. 0 354 259. The use of product gas for purge and/or repressurization is presented in representative U.S. Pat. Nos. 5,328,503, 5,411,578, 5,429,666, and 5,656,067. U.S. Pat. Nos. 5,330,561 and 5,203,888 disclose bed repressurization using pressurized feed gas or product gas.

It is desirable in pressure swing adsorption processes to minimize or eliminate the need to use final product gas for purge and repressurization. This can be difficult in many cases due to feed gas composition, product purity requirements, and product recovery requirements. The present invention, which is described below and defined by the claims which follow, allows maximum product recovery by not requiring the use of final product gas in purge and repressurization steps. This results in reduced power consumption and capital cost for the process.

BRIEF SUMMARY OF THE INVENTION

The invention is a pressure swing adsorption process for the separation of a pressurized feed gas containing at least one more strongly adsorbable component and at least one less strongly adsorbable component. The process comprises the steps of:

(a) introducing the pressurized feed gas into a feed end of an adsorber bed containing one or more solid adsorbents which preferentially adsorb the more strongly adsorbable component and withdrawing from a product end of the adsorber bed a first adsorber effluent gas enriched in the less strongly adsorbable component, wherein the first adsorber effluent gas is utilized as final product gas;

(b) terminating the introduction of the pressurized feed gas into the adsorber bed while withdrawing from the product end of the adsorber bed a second adsorber effluent gas enriched in the less strongly adsorbable component, wherein the pressure in the adsorber bed decreases while the second adsorber effluent gas is withdrawn therefrom, and wherein the second adsorber effluent gas is utilized as additional final product gas;

(c) depressurizing the adsorber bed to a minimum bed pressure by withdrawing additional gas therefrom;

(d) repressurizing the adsorber bed by introducing repressurization gas into the bed, wherein at least a portion of the repressurization gas is provided by pressurized feed gas and none of the repressurization gas is provided by the final product gas; and (e) repeating steps (a) through (d) in a cyclic manner.

The adsorber bed can be one of a plurality of adsorber beds, each of which undergoes in turn steps (a) through (e).

The depressurizing of each adsorber bed in step (c) can be accomplished by (c1) withdrawing a first gas stream from the bed until the pressure therein reaches a first intermediate pressure;

(c2) withdrawing a second gas stream from the bed until the pressure therein reaches a second intermediate pressure; and (c3) evacuating the bed from the feed end until the pressure therein reaches the minimum bed pressure.

The process can further comprise purging each bed following the evacuation of step (c3) by introducing a purge gas into the product end of the bed while continuing to evacuate gas from the feed end of the bed. The purge gas can be provided to the bed by the first gas stream withdrawn from another bed in step (c1).

The process can further comprise evacuating the bed from the feed end while withdrawing the second gas stream from the product end of the bed during step (c2). A portion of the repressurization gas introduced into a bed can be provided by the second gas stream withdrawn from another bed in step (c2).

The pressurized feed gas can be air, in which case the more strongly adsorbable component is nitrogen, the less strongly adsorbable component is oxygen, and the final product gas is enriched in oxygen. A portion of the repressurization gas in step (d) can be provided by allowing atmospheric air to flow into the adsorber bed when the pressure in the bed is initially below atmospheric pressure.

The adsorber bed optionally can be a single adsorber bed. In this case, the depressurizing of the adsorber bed in step (c) can be accomplished by (c1) withdrawing a first gas stream from the bed until the pressure therein reaches a first intermediate pressure;

(c2) withdrawing a second gas stream from the bed until the pressure therein reaches a second intermediate pressure; and (c3) evacuating the bed from the feed end until the pressure therein reaches the minimum bed pressure.

The process can further comprise purging the bed following the evacuation of step (c3) by introducing a purge gas into the product end of the bed while continuing to evacuate gas from the feed end of the bed. At least a portion of the additional gas withdrawn while depressurizing the adsorber by withdrawing gas therefrom in step (c) optionally is introduced into a gas storage tank. The purge gas can be provided to the bed by at least a portion of the gas introduced into the gas storage tank in step (c).

Portions of the first adsorber effluent gas and the second adsorber effluent gas can be introduced into a product gas storage tank during steps (a) and (b), and stored gas can be withdrawn from the product storage tank during steps (c) and (d) to provide final product gas.

In one possible embodiment, the present invention is a pressure swing adsorption process for the separation of a pressurized feed gas containing at least one more strongly adsorbable component and at least one less strongly adsorbable component which comprises the steps of:

(a) introducing the pressurized feed gas into a feed end of an adsorber bed containing one or more solid adsorbents which preferentially adsorbs the more strongly adsorbable component and withdrawing from a product end of the adsorber bed a first adsorber effluent gas enriched in the less strongly adsorbable component, wherein the first adsorber effluent gas is utilized as a final product gas, wherein the adsorber bed is one of a plurality of adsorber beds;

(b) terminating the introduction of the pressurized feed gas into the adsorber bed while withdrawing from the product end of the adsorber bed a second adsorber effluent gas enriched in the less strongly adsorbable component, wherein the pressure in the adsorber bed decreases while the second adsorber effluent gas is withdrawn therefrom, and wherein the second adsorber effluent gas is utilized as a final product gas;

(c) depressurizing the adsorber bed to a minimum bed pressure by withdrawing additional gas therefrom, wherein the depressurizing of the adsorber bed is accomplished by (c1) withdrawing a first gas stream from the bed until the pressure therein reaches a first intermediate pressure;

(c2) withdrawing a second gas stream from the bed until the pressure therein reaches a second intermediate pressure; and (c3) evacuating the bed from the feed end until the pressure therein reaches the minimum bed pressure;

(d) purging the bed following the evacuation of step (c3) by introducing a purge gas into the product end of the bed while continuing to evacuate gas from the feed end of the bed, wherein the purge gas is provided to the bed by the first gas stream withdrawn from another bed in step (c1);

(e) repressurizing the adsorber bed by introducing the second gas stream withdrawn from another bed during step (c2);

(f) further repressurizing the adsorber bed by introducing pressurized feed gas into the bed; and (g) repeating steps (a) through (f) in a cyclic manner; wherein none of the repressurization gas in (e) and (f) is provided by the final product gas.

The pressurized feed gas can be air, in which case the more strongly adsorbable component is nitrogen, the less strongly adsorbable component is oxygen, and the final product gas is enriched in oxygen. The process can further comprise, following step (e) and prior to step (f), allowing atmospheric air to flow into the adsorber bed when the pressure in the bed is initially below atmospheric pressure. The process can further comprise evacuating the bed from the feed end while withdrawing the second gas stream from the product end of the bed during step (c2).

BRIEF DESCRIPTION OF SEVERAL VIEWS OF THE DRAWINGS

FIG. 1 is a cycle chart for a three-bed embodiment of the present invention.

DETAILED DESCRIPTION OF THE INVENTION

Figure 2:
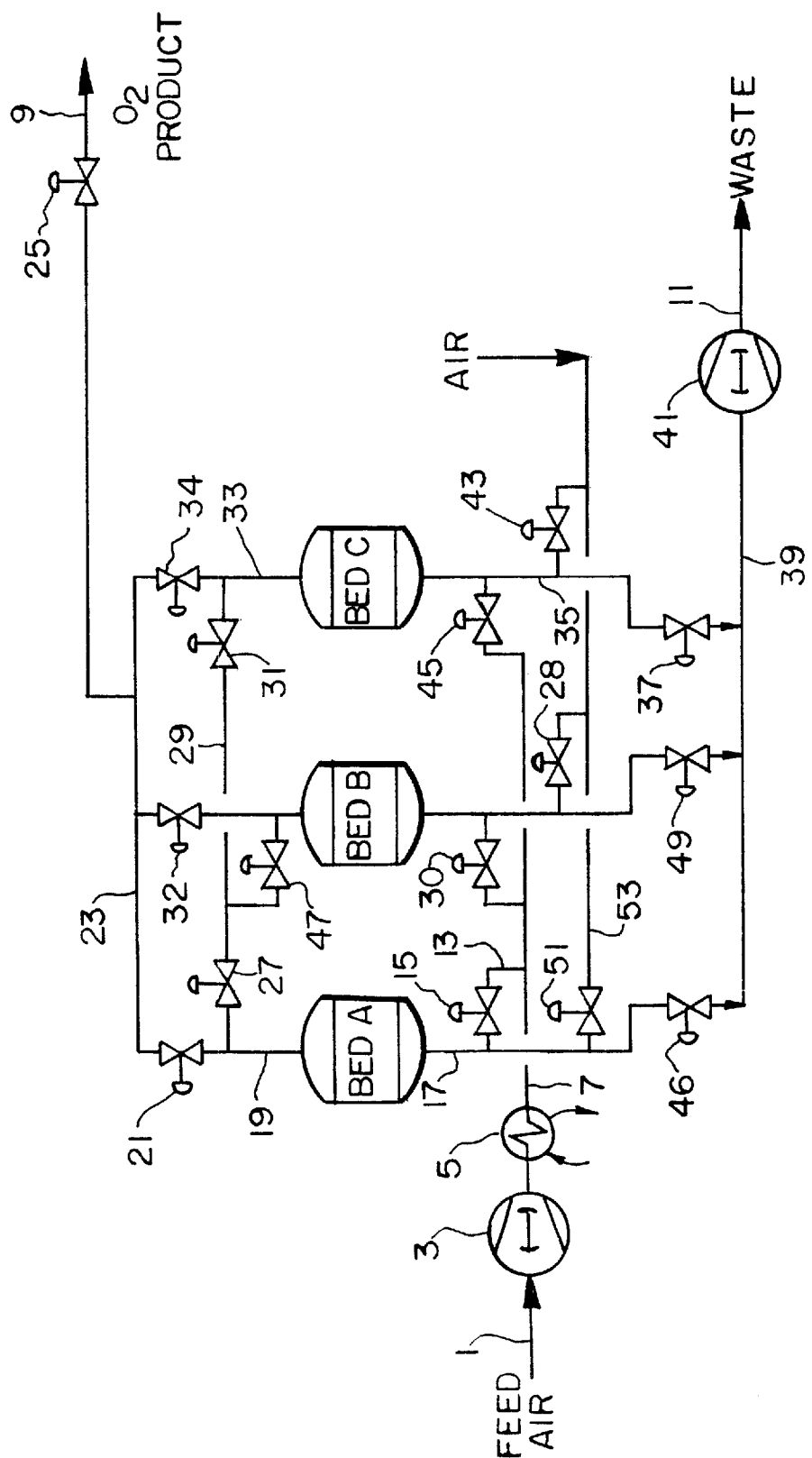
FIG. 2 is a schematic flow diagram for a three-bed embodiment of the present invention.

The invention is a pressure swing adsorption process for separating gas mixtures by a process cycle in which none of the final product gas is required for purge or repressurization. The process is especially useful for recovering an oxygen-enriched product from air and can utilize one or a plurality of adsorbers for carrying out the preferred process cycle.

In the present disclosure, the term final product gas means gas of sufficient product purity withdrawn from the adsorber bed(s) which is sent, with or without intermediate storage, to a final end use. None of the final product gas is returned to any of the adsorbent beds during any of the cycle steps. A feed step occurs during the time in which pressurized feed gas is introduced into the adsorber bed. A make product step is defined generically by the withdrawal of final product gas from the product end of an adsorber bed. A make product/feed step is defined as the withdrawal of final product gas from the product end of a bed while pressurized feed gas is introduced into the feed end of the bed. A make product/no feed step is defined as the withdrawal of final product gas from the product end of a bed without the introduction of pressurized feed gas into the feed end of the bed.

Depressurization is defined as the withdrawal of gas from the adsorber bed accompanied by decreasing adsorber pressure. Depressurization can be achieved by venting gas from a superatmospheric pressure directly to the atmosphere or transferring gas to another process vessel or enclosed volume which is at a lower pressure. Depressurization also can be achieved by evacuation, defined as the withdrawal of gas from the adsorber by mechanical means such as a vacuum pump or blower. Evacuation can be carried out over any range of adsorber pressures, but typically is carried out at subatmospheric pressures, i.e., under vacuum. Repressurization is defined as the introduction of gas into the adsorber vessel accompanied by increasing adsorber pressure.

Purge is defined as the introduction of a purge gas into one end of the adsorber while an effluent gas is withdrawn from the other end of the vessel. Purge can be carried out at decreasing pressure, increasing pressure, constant pressure, or any combination thereof Purge is generally most effective at subatmospheric pressures. Void space gas is defined as nonadsorbed gas contained within the interstitial or interparticle volume within the adsorber vessel, and includes gas in the piping and vessel dead volume which is not occupied by adsorbent. Atmospheric air is uncompressed air obtained directly from the surrounding atmosphere.

The process cycle of the present invention can be carried out using a single adsorber bed or preferably a plurality of adsorber beds. The process can be used to separate any gas mixture comprising more strongly adsorbed and less strongly adsorbed components, and is especially useful for recovering an oxygen-enriched product from air. A preferred embodiment utilizes three adsorber beds and illustrates the invention as described below by the cycle time chart of FIG. 1 and the process flow sheet of FIG. 2. Definitions of each cycle step are given in Table 1 below.

TABLE 1

Cycle Step Definitions for FIG. 1 Cycle Chart

| Cycle Step | Definition |
| --- | --- |
| Make Product/Feed | Withdraw final product gas from one end of a bed while introducing pressurized feed gas into the other end |
| Make Product/No Feed | Withdraw final product gas at decreasing pressure from a bed without introduction of pressurized feed |
| Provide Purge | Withdraw gas from a bed at decreasing pressure for use as purge gas in another bed |
| PPE/Evac | Simultaneously evacuate a bed from one end of a bed while withdrawing gas from the other end of the bed which is sent to another bed to provide gas for pressure equalization |
| Evacuation | Withdraw gas from a bed until pressure reaches a minimum pressure |
| Rec Purge | Evacuate a bed from one end while introducing purge gas from another bed into the other end of the bed |
| PE/Atm | Pressurize a bed by introducing gas from another bed into one end of the bed while drawing atmospheric air into the other end |
| Atm Rep | Pressurize a bed by drawing atmospheric air into the bed |
| Atm/Feed Repress | Pressurize a bed by drawing atmospheric air into one end of the bed for a portion of the cycle step while introducing pressurized feed into the other end during the entire cycle step |

The process system of FIG. 2 comprises three adsorber beds A, B, and C containing one or more adsorbents which preferentially adsorb at least one component in the feed gas. The beds are connected by the appropriate piping and valves as is known in the art such that the beds can proceed through the cycle steps described below. Gas mixture 1, preferably air which has been filtered to remove particulate matter (not shown), is pressurized to 1.1 to 2.5 bara in blower 3 and cooled if required in cooler 5 to provide pressurized feed gas in line 7 at about ambient temperature. The pressurized feed gas is separated into oxygen-rich final product in line 9 typically having an average oxygen concentration of at least 80 vol% and a waste gas in line 11 according to the following cycle steps (see FIGS. 1 and 2).

1. Make Product/Feed

Pressurized feed gas from line 7 passes through line 13, open valve 15, and line 17 into adsorber bed A which contains at least one adsorbent material which preferentially adsorbs nitrogen. Typical adsorbents known in the art for this purpose include zeolites which are ion exchanged with one or more cations selected from sodium, lithium, calcium, and other cations. Two or more adsorbents can be used if desired.

Oxygen-enriched gas is withdrawn from bed A and flows through line 19, open valve 21, and manifold 23 to provide final product gas which passes through flow control valve 25 and line 9 to the end user. During this step, defined as a make product/feed step, valve 27 remains closed and the pressure in bed A increases to a maximum pressure typically in the range of 1.1 to 2.5 bara. The duration of this step can be up to about 20 seconds.

While bed A is undergoing the make product/feed step, bed B is purged and partially repressurized by gas supplied by depressurization of bed C.

2. Make Product/No Feed

The pressurized feed gas flow to bed A is terminated by closing valve 15. Product gas continues to be withdrawn from bed A and flows through open valve 21, manifold 23, and flow control valve 25 to provide final product gas through line 9. This is defined as a make product/no feed step. The pressure in bed A and of the product gas withdrawn therefrom decreases by about 0.015 to 0.5 bar during this step. The composition of the product gas withdrawn from bed A changes during this step but remains in the required purity range for the final gas product. The duration of this step is typically in the range of 5.0 to 20 seconds.

While bed A is undergoing the make product/no feed step, Bed B undergoes repressurization and bed C undergoes evacuation.

3. Provide Purge

Valve 21 is closed, valve 27 is opened, and bed A is depressurized through manifold 29 and open valve 31. The depressurization gas flows via line 33 through bed C, which undergoes a purge step during which gas is withdrawn via line 35, open valve 37, and manifold 39 to vacuum blower 41 which discharges waste gas through line 11. Valves 34, 43 and 45 remain closed during this step. During the provide purge step, the pressure in bed A decreases by about 0.1 to 0.5 bar. The duration of this step is typically in the range of 1.0 to 10 seconds. During this step and the following step, bed B proceeds through a make product/feed step.

4. Provide Pressure Equalization/Evacuation

Evacuation of bed C ends and evacuation of bed A optionally begins by closing valve 37 and opening valve 46. Additional gas flows from bed A into bed C via manifold 29 until the pressures are equalized or nearly equalized in the two beds. The duration of this step is typically in the range of 1.0 to 10 seconds. During this step and the preceding step, bed B proceeds through a make product/feed step. When the pressures are equalized or nearly equalized in the two beds, valves 27, 31, and 37 are closed, bed A proceeds to the evacuation step, and bed C begins an atmospheric repressurization step.

5. Evacuation

Gas is evacuated from bed A via manifold 39 by vacuum blower 41 until the pressure in the bed reaches a minimum pressure typically in the range of 0.2 to 0.8 bara. The duration of this step is typically in the range of 5.0 to 20 seconds. During this step, bed B proceeds through a make product/no feed step and bed C undergoes repressurization.

6. Purge

Evacuation of bed A continues while the bed is purged with depressurization gas supplied from bed B which proceeds through a provide purge step. This purge desorbs residual adsorbed nitrogen and prepares bed A for repressurization. Valves 27 and 47 are opened and valves 28, 30, 32, and 49 are closed during this step, the duration of which is typically in the range of 1.0 to 10 seconds. During this step and the following step, bed C proceeds through a make product/feed step.

7. Pressure Equalization/Atmospheric Repressurization

Evacuation of bed A is terminated by closing valve 46 and equalization gas continues to flow into bed A from bed B through valves 47 and 27 and line 19. Meanwhile, evacuation of bed B begins by opening valve 49. Simultaneously, valve 51 is opened and atmospheric air flows through manifold 53 and line 17 thereby repressurizing bed A. Air entering manifold 53 can be filtered to remove particulate matter (not shown). When the pressures in beds A and B are equalized or nearly equalized, valves 27 and 47 are closed. The duration of this step is typically in the range of 1.0 to 10 seconds. During this step, bed C continues through a make product/feed step.

8. Atmospheric Repressurization

Atmospheric air continues to repressurize bed A via valve 51 and manifold 53 until the pressure therein approaches atmospheric pressure. The duration of this step is typically in the range of 1.0 to 10 seconds. During this step, bed B proceeds through an evacuation step and bed C proceeds through a make product/no feed step.

9. Atmospheric/Feed Repressurization

Pressurized feed air from line 7 is introduced through line 13 and open valve 15 via line 17 into bed A, while atmospheric air optionally continues to flow into bed A via open valve 51 and manifold 53, thereby increasing the pressure in bed A. This continues until the pressure therein is at or near atmospheric pressure, at which time valve 51 closes and repressurization continues by the introduction of pressurized feed gas via valve 15 and line 17. When the pressure at the top or product end of bed A approaches the pressure in line 23, valve 21 is opened, the atmospheric/feed repressurization step ends, and the make product step begins the cycle again. The duration of the atmospheric/feed repressurization step is typically in the range of 4.0 to 20 seconds. During this step, bed B continues through an evacuation step and bed C continues through a make product/no feed step.

Adsorbent beds B and C proceed in turn through the same series of steps described above, and interact with each other and with bed A according to the cycle time chart of FIG. 1. While the embodiment described above uses three adsorbent beds, more or fewer beds can be used. If desired, a single bed can be used, but a gas storage tank would be required to hold gas from the provide purge and provide pressure equalization steps for later use in the purge and pressure equalization steps. In addition, a final product gas storage tank would be required to store a portion of the final product gas during the make product and make product/no feed steps for delivery to the end user during the evacuation, purge, and repressurization steps.

In the operation of the oxygen PSA process described above, it is preferred to set the highest pressure (during the make product/feed step) in the range of 1.1 bara to 2.5 bara, and the lowest pressure (during the evacuation step) in the range of 0.2 bara and 0.8 bara. One or more feed blowers may be necessary to feed the bed during the higher bed pressure period of the make product/feed step and also during the time in which the feed repressurization step is above ambient pressure. One or more vacuum blowers can be used during at least a portion of the counter-current depressurization and purge steps.

The process cycle of the present invention is especially suitable for operation at higher pressures in the range described above. At a higher peak pressure, more void space gas is available for co-current depressurization, and more co-current depressurization gas is available for making product, for purge, and for counter-current repressurization of an adsorber bed. The higher pressure during the feed/make product step also increases the capacity of the adsorbent, which reduces bed size. The higher product pressure allows for reduction of the product compressor size and compressor power consumption. By operating the process at a higher feed pressure, it is also possible to increase the minimum pressure during the evacuation step, thereby reducing the vacuum requirement of the process. This makes it possible to use fewer vacuum blower stages in the process, or to increase the isothermal efficiency of the vacuum blower. While the feed compression step does consume more power when operating at higher feed pressures, the benefits mentioned above more than compensate for this and allow an overall reduction in specific power.

Thus the process of the present invention allows maximum delivery rates of final product gas because no final product gas is required for purge or repressurization in the process cycle steps. All required purge gas is supplied by intermediate depressurization gas and all required repressurization gas is supplied by intermediate depressurization gas and by pressurized feed gas. The operation of the process at higher pressures results in operating benefits and reduced specific power. The process can be operated with a single adsorber bed, but preferably is operated with multiple adsorber beds and more preferably with three beds. The process is especially suitable for the recovery of oxygen from air.

The essential characteristics of the present invention are described completely in the foregoing disclosure. One skilled in the art can understand the invention and make various modifications without departing from the basic spirit of the invention, and without deviating from the scope and equivalents of the claims which follow.

What is claimed is:

1. A pressure swing adsorption process for the separation of a pressurized feed gas containing at least one more strongly adsorbable component and at least one less strongly adsorbable component which comprises the steps of:

(a) introducing the pressurized feed gas into a feed end of an adsorber bed containing one or more solid adsorbents which preferentially adsorb the more strongly adsorbable component and withdrawing from a product end of the adsorber bed a first adsorber effluent gas enriched in the less strongly adsorbable component, wherein the first adsorber effluent gas is utilized as final product gas;

(b) terminating the introduction of the pressurized feed gas into the adsorber bed while withdrawing from the product end of the adsorber bed a second adsorber effluent gas enriched in the less strongly adsorbable component, wherein the pressure in the adsorber bed decreases while the second adsorber effluent gas is withdrawn therefrom, and wherein the second adsorber effluent gas is utilized as additional final product gas;

(c) depressurizing the adsorber bed to a minimum bed pressure by withdrawing additional gas therefrom;

(d) repressurizing the adsorber bed by introducing repressurization gas into the bed, wherein at least a portion of the repressurization gas is provided by pressurized feed gas and none of the repressurization gas is provided by the final product gas; and (e) repeating steps (a) through (d) in a cyclic manner.

2. The process of claim 1 wherein the adsorber bed is one of a plurality of adsorber beds, each of which undergoes in turn steps (a) through (e).

3. The process of claim 2 wherein the depressurizing of each adsorber bed in step (c) is accomplished by (c1) withdrawing a first gas stream from the bed until the pressure therein reaches a first intermediate pressure;

(c2) withdrawing a second gas stream from the bed until the pressure therein reaches a second intermediate pressure; and (c3) evacuating the bed from the feed end until the pressure therein reaches the minimum bed pressure.

4. The process of claim 3 which further comprises purging each bed following the evacuation of step (c3) by introducing a purge gas into the product end of the bed while continuing to evacuate gas from the feed end of the bed.

5. The process of claim 4 wherein the purge gas is provided to the bed by the first gas stream withdrawn from another bed in step (c1).

6. The process of claim 3 which further comprises evacuating the bed from the feed end while withdrawing the second gas stream from the product end of the bed during step (c2).

7. The process of claim 3 wherein a portion of the repressurization gas introduced into a bed is provided by the second gas stream withdrawn from another bed in step (c2).

8. The process of claim 1 wherein the pressurized feed gas is air, the more strongly adsorbable component is nitrogen, the less strongly adsorbable component is oxygen, and the final product gas is enriched in oxygen.

9. The process of claim 8 wherein a portion of the repressurization gas in step (d) is provided by allowing atmospheric air to flow into the adsorber bed when the pressure in the bed is initially below atmospheric pressure.

10. The process of claim 1 wherein the adsorber bed is a single adsorber bed.

11. The process of claim 10 wherein the depressurizing of the adsorber bed in step (c) is accomplished by (c1) withdrawing a first gas stream from the bed until the pressure therein reaches a first intermediate pressure;

(c2) withdrawing a second gas stream from the bed until the pressure therein reaches a second intermediate pressure; and (c3) evacuating the bed from the feed end until the pressure therein reaches the minimum bed pressure.

12. The process of claim 11 which further comprises purging the bed following the evacuation of step (c3) by introducing a purge gas into the product end of the bed while continuing to evacuate gas from the feed end of the bed.

13. The process of claim 12 wherein at least a portion of the additional gas withdrawn while depressurizing the adsorber by withdrawing gas therefrom in step (c) is introduced into a gas storage tank.

14. The process of claim 13 wherein the purge gas is provided to the bed by at least a portion of the gas introduced into the gas storage tank in step (c).

15. The process of claim 10 wherein portions of the first adsorber effluent gas and the second adsorber effluent gas are introduced into a product gas storage tank during steps (a) and (b), and stored gas is withdrawn from the product storage tank during steps (c) and (d) to provide final product gas.

16. A pressure swing adsorption process for the separation of a pressurized feed gas containing at least one more strongly adsorbable component and at least one less strongly adsorbable component which comprises the steps of:

(a) introducing the pressurized feed gas into a feed end of an adsorber bed containing one or more solid adsorbents which preferentially adsorbs the more strongly adsorbable component and withdrawing from a product end of the adsorber bed a first adsorber effluent gas enriched in the less strongly adsorbable component, wherein the first adsorber effluent gas is utilized as a final product gas, wherein the adsorber bed is one of a plurality of adsorber beds;

(b) terminating the introduction of the pressurized feed gas into the adsorber bed while withdrawing from the product end of the adsorber bed a second adsorber effluent gas enriched in the less strongly adsorbable component, wherein the pressure in the adsorber bed decreases while the second adsorber effluent gas is withdrawn therefrom, and wherein the second adsorber effluent gas is utilized as a final product gas;

(c) depressurizing the adsorber bed to a minimum bed pressure by withdrawing additional gas therefrom, wherein the depressurizing of the adsorber bed is accomplished by (c1) withdrawing a first gas stream from the bed until the pressure therein reaches a first intermediate pressure:

(c2) withdrawing a second gas stream from the bed until the pressure therein reaches a second intermediate pressure; and (c3) evacuating the bed from the feed end until the pressure therein reaches the minimum bed pressure;

(d) purging the bed following the evacuation of step (c3) by introducing a purge gas into the product end of the bed while continuing to evacuate gas from the feed end of the bed, wherein the purge gas is provided to the bed by the first gas stream withdrawn from another bed in step (c1):

(e) repressurizing the adsorber bed by introducing the second gas stream withdrawn from another bed during step (c2);

(f) further repressurizing the adsorber bed by introducing pressurized feed gas into the bed; and (g) repeating steps (a) through (f) in a cyclic manner; wherein none of the repressurization gas in (e) and (f) is provided by the final product gas.

17. The process of claim 16 wherein the pressurized feed gas is air, the more strongly adsorbable component is nitrogen, the less strongly adsorbable component is oxygen, and the final product gas is enriched in oxygen.

18. The process of claim 17 which further comprises, following step (e) and prior to step (f), allowing atmospheric air to flow into the adsorber bed when the pressure in the bed is initially below atmospheric pressure.

19. The process of claim 16 which further comprises evacuating the bed from the feed end while withdrawing the second gas stream from the product end of the bed during step (c2).

* * * * *